S. M. KITCHEN.
SCYTHE.
APPLICATION FILED AUG. 17, 1916.
1,283,414.
Patented Oct. 29, 1918.
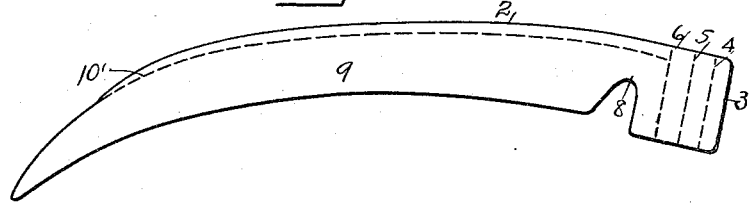
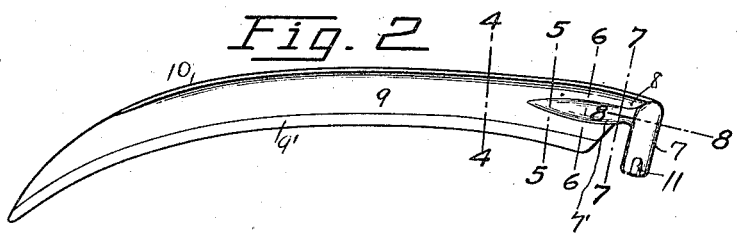
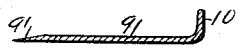
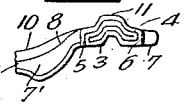
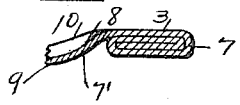
WITNESSES
A C Thomas
INVENTOR.
Samuel M. Kitchen
BY Harry D Wallace
ATTORNEY

UNITED STATES PATENT OFFICE.

SAMUEL M. KITCHEN, OF SALEM, NEW YORK, ASSIGNOR, BY MESNE ASSIGNMENTS, TO BARTLETT EDGE TOOL COMPANY, INC., A CORPORATION OF NEW YORK.

SCYTHE.

1,283,414.   Specification of Letters Patent.   Patented Oct. 29, 1918.

Application filed August 17, 1916. Serial No. 115,532.

*To all whom it may concern:*

Be it known that I, SAMUEL M. KITCHEN, a citizen of Great Britain, residing at Salem, in the county of Washington and State of New York, have invented certain new and useful Improvements in Scythes, of which the following is a specification.

This invention relates to an improvement in scythes, and the invention relates particularly to the construction of the blade together with the integral tang and heel.

Heretofore, in the construction of scythes, wherein the blades and tangs comprised single parts, a piece of hard steel was inserted between two pieces of soft steel and the whole heated, welded and rolled to the requisite shape and thinness. The inlaid hard steel was for the cutting edge and after the rolling process was suitably tempered. The back of the blade and the tang consisted entirely of the soft steel which was readily forged into shape and was untempered. Under this old method of making scythes, it required as many as eight heats in order to complete the rolling and forging of a blade, and so many heats destroyed the quality of the hard steel to such extent that few of the old scythes retained their cutting edges for any appreciable length of time. Various other methods of constructing scythes later have been attempted, particularly those shown and described in Letters Patent Nos. 992,476, 1,133,423 and 1,187,432. All of these cover high grade cutting steel blades which are supported by tang and heel plates of softer metal, the latter being riveted to the blades. These built-up scythes, owing to the nature of the materials used—the extreme thinness and lightness of the steel parts which are riveted together, and the great strains under which the devices are used, soon weaken and the parts work loose at the heel ends and become unfit for service. It is an object of the present invention to provide a scythe wherein the entire blade and tang or heel end are constructed from a single piece of high grade cutting sheet steel, which is normally of the proper gage for the purpose, and therefore does not require any rolling for thinning the same. A further object is to provide a novel, simple and convenient method of forming up the scythe for giving the blade the requisite strength and stiffness, and for folding and rolling up and forging the integral tang, as well as for corrugating certain portions of the heel end of the blade for giving to it the strength formerly produced by the relatively heavy malleable heel plates, shown in the patents referred to. And a further object is generally to simplify, strengthen, and to lessen the cost of scythes.

The various features and parts of the invention will be understood from the detailed description which follows, and by reference to the accompanying drawing illustrating the same, in which—

Figure 1 is a plan view of the blank preparatory to forming up the scythe blade.

Fig. 2 is a similar view of the completed blade.

Fig. 3 is a view looking toward the cutting edge of the blade.

Fig. 3$^a$ is an enlarged view of the tang shown in Fig. 3.

Fig. 4 is a cross section taken on line 4—4 of Fig. 2; showing the plain web and back flange of the blade.

Figs. 5, 6 and 7 are similar views; showing the extent and the progress of the corrugations of the heel end of the blade.

Fig. 8 is a longitudinal section taken on line 8—8 of Fig. 2; showing the rolled up and forged tang.

In the drawing, Fig. 1 illustrates the sheet steel blank 2 before it is operated upon, for producing the finished scythe blade shown in Fig. 2. This blank is preferably cut from the highest grade of steel for producing a keen and lasting cutting edge when properly tempered. The blank 2 is first heated in a suitable manner at its heel end 3, the latter having a relatively large area as shown. The next step is to fold the end 3 upon itself and roll it up, the successive folds being made substantially on the dotted lines 4, 5 and 6, until the heel 3 is brought to the condition or shape shown in Fig. 8, for forming the integral tang 7. After the folding of the part 3, as described, the whole blank is again heated and placed between the sections of a suitable die or mold, and sufficient pressure is applied to the die to compress the scythe into the shape or form shown in Figs. 2, and 3. The compression of the tang 7 while hot, as last described, also preferably forms the corrugations 7$^1$ of the neck 8 and the adjacent portion of the web 9 of the blade, as shown in Figs. 2, 3, 5, 6 and 7 for giving adequate strength to the heel end of the blade. The back flange 10, which serves to stiffen the relatively long blade, is likewise bent up substantially at right-angles to the web 9 on dotted line 10', by the same dies and by the same operation as the other parts are formed up. After the scythe is ejected from the dies, the blade is suitably tempered and ground and is then ready for use. The tang 7 is operated upon by the said dies for providing near its free end a lug or tooth 11, which engages certain parts of the usual handle or snathe (not shown) for holding the scythe in place.

So far as applicant is aware his method of making scythes, as herein shown and described, has hitherto been unknown to the art. By his method he is able to construct from a single piece of high grade carbon or tool steel, a scythe comprising the blade, with its integral back flange and heel, the latter being folded upon itself a number of times for producing a relatively heavy and strong tang, and the whole of said device being constructed from sheet steel of the proper gage, thus eliminating considerable time, labor and expense formerly required for rolling and forging scythes of the class.

Having thus described my invention, what I claim as new and desire to secure by Letters Patent, is—

1. A scythe comprising a blade having an upturned right angle back flange and having an integral tang several fold thicker than the blade, and having a neck connecting the tang to the blade, said neck having the same thickness as the blade, and said neck and a portion of said blade adjacent the neck being corrugated and both of said parts bent downwardly for stiffening the heel end of the scythe.

2. In a scythe, the combination of the blade having a right angle back flange and having an integral tang of greater thickness than the blade, and having a narrow longitudinally corrugated neck connecting the blade to the tang, the said corrugation starting from the inner margin of the tang, extending forwardly and decreasing and ending a short distance beyond the neck, said neck including said corrugation being bent downwardly for disposing the tang in a higher plane than the web of the blade when the blade is in the horizontal position.

In testimony whereof I affix my signature.

SAMUEL M. KITCHEN.

Copies of this patent may be obtained for five cents each, by addressing the "Commissioner of Patents, Washington, D. C."